(12) United States Patent
Briggs et al.

(10) Patent No.: US 11,501,791 B1
(45) Date of Patent: Nov. 15, 2022

(54) LOOPBACK AUDIO CHANNELS FOR ECHO CANCELLATION IN WEB BROWSERS

(71) Applicant: Hopin Ltd, London (GB)

(72) Inventors: Dan Briggs, Vancouver, WA (US); Geige Vandentop, Vancouver, WA (US)

(73) Assignee: Hopin Ltd, London (GB)

( * ) Notice: Subject to any disclaimer, the term of this patent is extended or adjusted under 35 U.S.C. 154(b) by 0 days.

(21) Appl. No.: 17/532,620

(22) Filed: Nov. 22, 2021

(51) Int. Cl.
| | |
|---|---|
| *G10L 21/0232* | (2013.01) |
| *G10L 25/57* | (2013.01) |
| *G06F 3/16* | (2006.01) |
| *G10L 21/0208* | (2013.01) |
| *H04L 65/611* | (2022.01) |

(52) U.S. Cl.
CPC .......... *G10L 21/0232* (2013.01); *G06F 3/165* (2013.01); *G10L 25/57* (2013.01); *H04L 65/611* (2022.05); *G10L 2021/02082* (2013.01)

(58) Field of Classification Search
CPC ................. G10L 21/0232; G10L 25/57; G10L 2021/02082; G06F 3/165; H04L 65/4076
See application file for complete search history.

(56) References Cited

U.S. PATENT DOCUMENTS

| | | | | |
|---|---|---|---|---|
| 10,154,148 | B1 * | 12/2018 | Chu ...................... | H04M 3/002 |
| 10,440,324 | B1 * | 10/2019 | Lichtenberg .......... | G10L 19/018 |
| 10,602,270 | B1 * | 3/2020 | Sørensen ............ | G10L 21/0208 |
| 2015/0249736 | A1 * | 9/2015 | Johnston ............. | H04M 1/6008 455/418 |
| 2015/0373057 | A1 * | 12/2015 | Ezell ................... | H04L 65/1069 709/204 |
| 2018/0007482 | A1 * | 1/2018 | Skoglund ............... | H04B 3/237 |
| 2019/0306297 | A1 * | 10/2019 | Irukuvajhula ........ | H03G 3/3005 |
| 2021/0058517 | A1 * | 2/2021 | Serbajlo ............. | H04L 12/1831 |

OTHER PUBLICATIONS

Issue 687574: AEC when using Web Audio API; Bugs; Chromium; Feb. 1, 2017; p. 1-23; retrieved on Dec. 8, 2021 from https://bugs.chromium.org/p/chromium/issues/detail?id=687574.

\* cited by examiner

*Primary Examiner* — Fariba Sirjani
(74) *Attorney, Agent, or Firm* — Erise IP, P.A.

(57) ABSTRACT

Media, methods, and systems are provided for audio rerouting to echo cancel audio in web browsers hosting video streams. Spoken audio from a presenter in a video stream may be received via a microphone on a presenter computing device using a first audio connection. Echo cancellation for the presenter may be enabled. Media audio from the presenter may be received originating from a second audio connection. In response to receiving the media audio, a loopback connection for the presenter may be created. In the loopback connection, the presenter may act as both the sender and receiver of the media audio. The loopback connection may have echo cancellation enabled and use the first audio connection. Once the loopback connection is created, the audio may be routed through the loopback connection. The audio may then be played out of an audio output device for the presenter with echo cancellation enabled.

20 Claims, 3 Drawing Sheets

LOOPBACK AUDIO CHANNELS FOR ECHO CANCELLATION IN WEB BROWSERS

TECHNICAL FIELD

Embodiments of the invention generally relate to echo cancellation. More specifically, certain embodiments of the invention relate to echo cancellation for a video stream running in a web browser using a loopback connection.

Echo cancellation in video conferencing is vitally important to quality of a video conference. When echoes are not properly cancelled, audio quality is substantially worse and can lead to miscommunication and frustration for participants in the video conference. Echoes typically occur when audio from a first participant of the video conference is played out via the speakers of a second participant, picked up by the second participant's microphone, and transmitted back to the first participant such that the first participant hears their own audio. Echo cancelling devices and software typically work by analyzing audio signals for similar signals and cancelling out the similar signals to eliminate echo.

Online video conferencing has become a popular method for participants in remote locations to communicate with one another. Video conferences can be used for various events, such as a work meeting, a conference, a convention, or the like. Often, video conferencing systems will employ a video client that runs in a web browser. Web browsers typically have built in features for echo cancelling audio. However, some web browsers may fail to properly echo cancel audio, thus leading to a poor video conferencing experience for participants utilizing the video client. What is needed is a method for performing echo cancellation in web browsers to improve the video conferencing experience for video conference participants.

SUMMARY

Embodiments of the invention address the above-identified need by providing mechanisms for echo cancelling audio for a video stream hosted in a web browser. When a presenter in a video stream is speaking, the web browser may automatically perform echo cancellation. The spoken audio may be transmitted using a WebRTC (Web Real-Time Communication) peer connection. However, when the presenter in the video stream shares audio that does not originate from a WebRTC connection, and the audio is also played out of the presenter's speakers and picked up by a microphone, echoes from the shared audio may not be cancelled by the web browser. As such, the web browser may not recognize the similar audio signals present, thus resulting in the echoes. In some embodiments, to cancel the shared audio, a loopback connection may be created for the presenter. The loopback connection may comprise a WebRTC connection that routes the audio from the presenter back to themselves. Thus, the presenter may serve as both the sender of the audio and the receiver of the audio when using the loopback connection. Once passed through the loopback connection, the audio may be played via the presenter's speakers and echo cancelled in the video stream.

In particular, in a first embodiment, the invention includes one or more non-transitory computer-readable media storing computer-executable instructions that, when executed by a processor, perform a method of audio rerouting for echo cancellation in web browsers hosting a video stream, the method comprising receiving, in a web browser and via a microphone on a presenter computing device, spoken audio from a presenter, the spoken audio routed to the video stream using a first audio connection, in response to receiving the spoken audio, enabling echo cancellation for the presenter, receiving from the presenter and via the microphone on the presenter computing device, media audio from the presenter, the media audio originating from a second audio connection, in response to receiving the media audio from the presenter, creating a loopback connection for the presenter, the loopback connection routed using the first audio connection, enabling echo cancelation for the loopback connection, routing the media audio from the presenter to the loopback connection and back to the presenter, and playing, at the presenter computing device, the media audio.

In a second embodiment, the invention includes a method of audio rerouting for echo cancellation in web browsers hosting a video stream, the method comprising receiving, in a web browser and via a microphone on a presenter computing device, spoken audio from a presenter, the spoken audio routed to the video stream using a first audio connection, in response to receiving the spoken audio, enabling echo cancellation for the presenter, receiving from the presenter and via the microphone on the presenter computing device the media audio, the media audio originating from a second audio connection, in response to receiving the media audio, routing a first copy of the media audio to the video stream using the first audio connection, in response to receiving the media audio, routing a first copy of the media audio to the video stream using the first audio connection, in response to receiving the media audio, routing a second copy of the media audio to a loopback connection, enabling echo cancellation for the loopback connection, and routing the second copy of the media audio to the loopback connection and back to the presenter, and playing, at the presenter computing device, the second copy of the media audio.

In a third embodiment, the invention includes a system for audio rerouting for echo cancellation in web browsers hosting a video stream, the system comprising an audio input device, an audio output device, a processor, and one or more non-transitory computer-readable media storing computer-executable instructions that, when executed by a processor, perform a method of audio rerouting for echo cancellation in web browsers hosting the video stream, the method comprising receiving, in a web browser and via the audio input device on a presenter computing device, spoken audio from a presenter, the spoken audio routed using a first audio connection, in response to receiving the spoken audio, enabling echo cancellation for the presenter, receiving, via the audio input device on the presenter computing device, media audio, the media audio originating from a second audio connection, in response to receiving the media audio, creating a loopback connection for the presenter, the loopback connection created using the first audio connection, enabling echo cancellation for the loopback connection, routing the media audio from the presenter to the loopback connection and back to the presenter, and playing, via the audio output device, the media audio.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
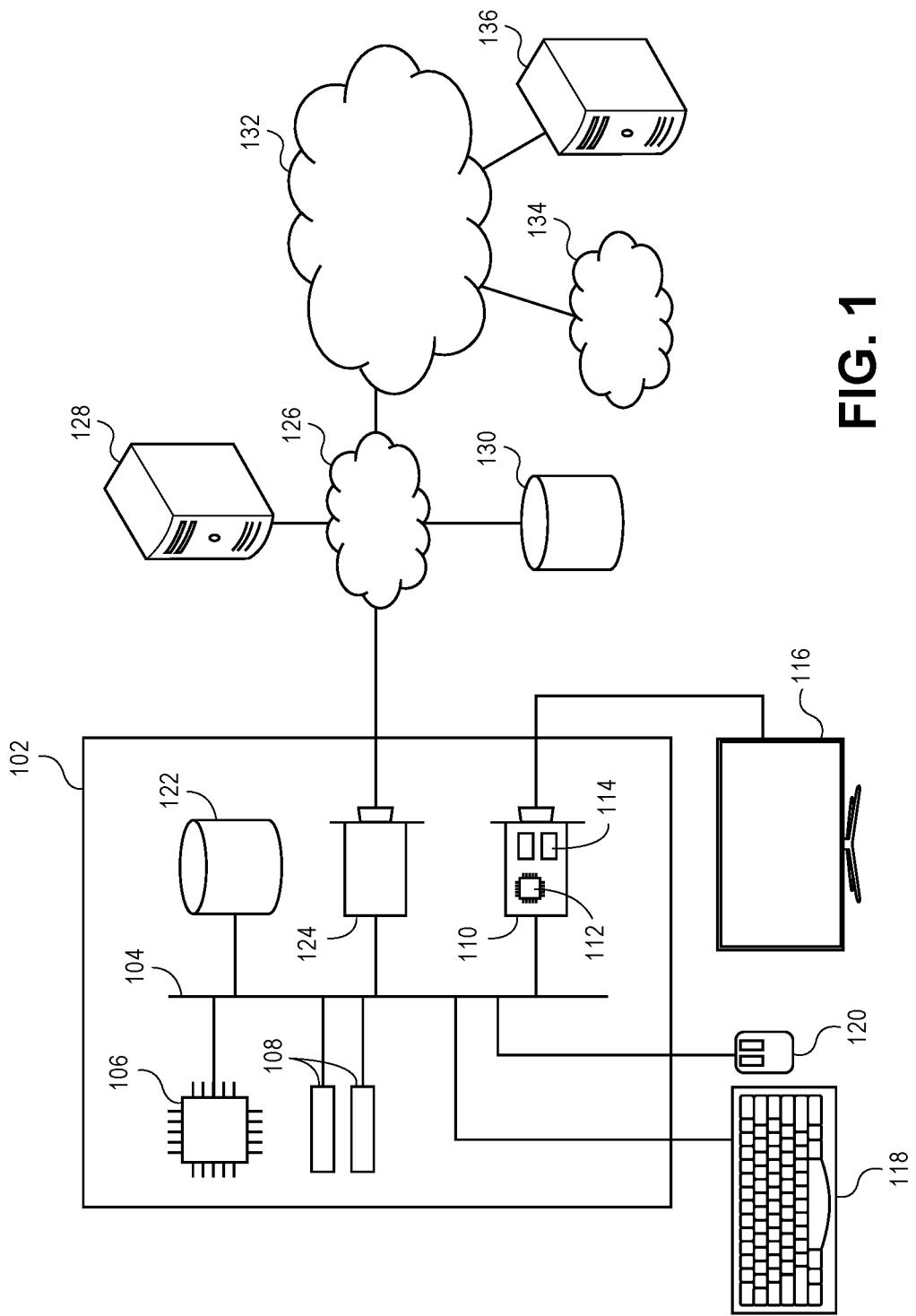
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "composite video live streaming" means streaming, substantially in real time, a composite video stream. In general, such a composite video stream may include a graphical background, one or more video streams, and other graphical layout components such as scrolling text, etc. Composite video live streaming may involve providing a proprietary or standardized video stream to a media provider, whose media platform may be leveraged to scale out a substantially live broadcast to a multitude of viewers of the live stream. Media providers include, inter alia, FACEBOOK, LINKEDIN, YOUTUBE, PERISCOPE, and TWITCH.

In some embodiments, a composite video live stream may be produced for streaming to a virtual event hosting platform. As used herein a "virtual event hosting platform" means an immersive, interactive online conference-hosting platform. Such platforms allow meeting participants to view presentations, participate in event sessions, network online, exchange virtual business cards, and engage in networking opportunities while preserving a record of connections made while attending a virtual event. A virtual event hosting platform may also enable hosting of in-person events as well as hybrid events that are hosted both in-person and virtually (online). A "virtual event hosting system" is an instantiation of a set of technical resources that provide for hosting of one or more virtual events in a virtual event hosting platform. In these embodiments, centralized mixing of composite video live streaming is employed to permit presenters on a virtual event hosting platform to use low computing power client devices to provide their portion of the live stream and permit the composite video live stream to be mixed in connection with centralized services. The centrally mixed composite video live stream is then distributed by one or more virtual event hosting systems to any number of participants viewing one or more events on the virtual event hosting platform.

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

FIG. 1 illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 124 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Such non-transitory, computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Disclosed embodiments are generally directed to echo cancellation techniques for video streams in the virtual event hosting platform when running in a web browser. However, embodiments of the invention may be applied generally for echo cancelling audio streams from any source. Video conferencing over the Internet is commonly accomplished using WebRTC peer connections between video stream participants. In some embodiments, participants in the video stream have peer connections with each of the other video stream participants. In some embodiments, participants have a peer connection with a server. In such embodiments, the server may receive media data from each of the participants and forward it to the other participants for display in the video stream. Typically, WebRTC implementations have echo cancellation enabled to improve the video stream experience for participants. However, some web browsers in which the virtual event hosting platform may be hosted may fail to echo cancel audio originating from a non-WebRTC connection. For example, a participant may share a video stored on their local computing device to the video stream. The virtual event hosting platform may send the audio to the other participants for output on their computing devices using a WebRTC connection. However, when the sharing participant plays the video locally, the audio may be picked up by the sharing participant's microphone and transmitted to the other participants, causing an echo. Because the audio file is local to the sharing participant's computer, it may not be transmitted over a WebRTC connection when played. Consequently, the other participants may hear an echo from the audio. To substantially reduce or eliminate the echo, a loopback connection may be created between the sharing participant and their own web browser. The loopback connection may comprise a WebRTC peer connection with echo cancellation enabled. As such, prior to playing audio from the shared video over the sharing participant's audio output device (e.g., speakers), the audio may be sent from the sharing participant to the loopback connection, and from the loopback connection back to the sharing participant, whereby the audio may be played over the sharing participant's audio output device. Because the loopback audio is routed through a WebRTC connection, when picked up by the sharing participant's microphone, the associated audio is processed to remove echo, which echo is removed from the corresponding audio stream provided to the other participants.

Figure 2:
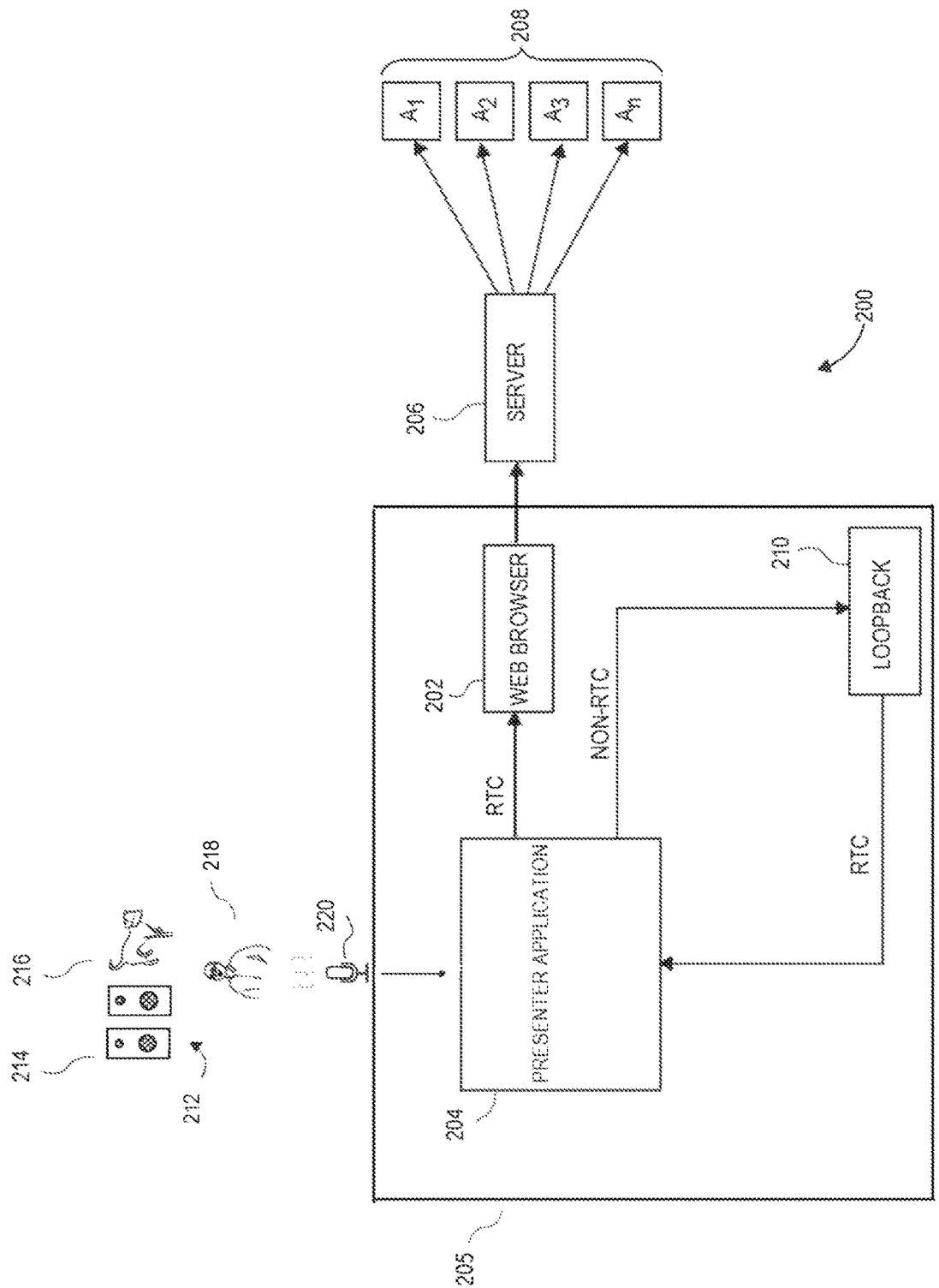
FIG. 2 depicts a block diagram of a system for echo cancellation for certain embodiments of the invention.

FIG. 2 illustrates a block diagram 200 of a system for echo cancelling audio in a video stream hosted by the virtual event hosting platform running in a web browser 202. Video streams hosted in the virtual event hosting platform may be for virtual video conferencing events, such as a work meeting, a conference, a showcase, a convention (e.g., Comic-Con), or any other type of virtual event. In some embodiments, the virtual event hosting platform hosts the video stream in various web browsers 202 (e.g., Chrome, Firefox, Edge, Safari, Opera, DuckDuckGo) that utilize WebRTC connections to share data between remote peers. In some embodiments, web browser 202 is based on the Chromium web browser, which is an open-source code base which may serve as the basis for a variety of different web browsers 202. During the video stream, a presenter 204 may upload video and audio data via web browser 202 to server 206. For example, presenter 204 may use a webcam to record their video and a microphone to record their audio. Server 206 may then forward the video and audio for presenter 204 to the other attendees 208 of the video stream for display on the attendees' 208 computing devices. In some embodiments, server 206 is one of a STUN (Session Traversal Utilities for NAT) server 206 or a TURN (Traversal Using Relays around NAT) server 206. In some embodiments, server 206 is configured to record audio and/or video for the video stream. In some embodiments, server 206 records only the spoken audio for the video stream and filters out background noise. In some embodiments, audio and/or video is recorded locally for each presenter 204 and attendee 208. In some such embodiments, each presenter 204 and attendee 208 may upload their recorded audio and/or video to server 206, and server 206 may mix or composite the recorded videos into a single media recording. Presenter 204 and attendees 208 may be connected directly via peer connections created via WebRTC, or presenter 204 and attendees 208 may have a peer connection to one or more servers 206. Typically, web browsers 202 perform echo cancellation on audio received via WebRTC connections. However, when audio is received that is not transmitted via a WebRTC connection, web browsers 202 may fail to properly echo cancel the associated audio stream.

In some embodiments, video stream participants are split into presenters 204 and attendees 208. In some embodiments, presenters 204 are authorized to share data, such as video, audio, and files, in the video stream. In some embodiments, attendees 208 do not have authorization to share data in the video stream and can only watch the video stream. While a single presenter 204 is illustrated as transmitting data to multiple attendees 208 (denominated $A_1$ to $A_n$), there may be multiple presenters 204 sharing video and audio data back and forth with other presenters 204, and embodiments described herein are not limited to enabling echo cancellation for a single presenter 204 sharing audio in the video stream.

Also illustrated in FIG. 2, and present in some embodiments, are audio outputs 212 for presenter 204, including, but not limited to, speakers 214, background audio 216, and spoken audio 218. Broadly, audio outputs 212 may comprise any audio output that is picked up by microphone 220. Speakers 214 may be speakers configured to play audio from the computing device for presenter 204. Speakers 214 may comprise laptop speakers, speakers on display 116, bookshelf speakers, or the like. Background audio 216 may represent any audio captured by microphone 220 that was not intended by presenter 204 to be included in the audio transmitted to the video stream. Background audio 216 may comprise any environmental noise from the environment in which presenter 204 is in, such as a barking dog, as illustrated. In some embodiments, background noise suppression is also enabled for the video stream in web browser 202 in response to detecting background audio 216. Another audio output 212 may be spoken audio 218 captured from presenter 204 when speaking. Audio outputs 212 may be captured by microphone 220 and transmitted as part of the video stream. If audio captured by microphone 220 is substantially similar to a previously detected audio signal and the captured audio came from a WebRTC connection, web browser 202 may recognize the audio as an echo and perform echo cancellation for the audio. If the audio captured by microphone 220 is substantially similar to a previously detected audio signal but does not originate from a WebRTC connection, web browser 202 may fail to properly echo cancel the audio. For example, presenter 204 may share a video stored locally on their computing device 205 to the attendees 208 as part of the video stream. When sharing local audio, presenter 204 may route two different audio tracks for the shared audio. A first audio track copy may be the audio sent to attendees 208 via the video stream and server 206 for attendees 208 to play at their computing device. The audio sent to attendees 208 (hereinafter referred to as the raw audio) may be sent using a WebRTC connection. The second audio track may be the audio routed from the computing device 205 for presenter 204 to their audio output 212, such as speakers 214, for playing the audio locally. The second audio track copy (hereinafter referred to as local audio) may not be sent using a WebRTC connection. As such, when microphone 220 receives the local audio of the shared video from speakers 214, the local audio may be captured by microphone 220 and transmitted to attendees 208 without being properly echo cancelled.

As illustrated in FIG. 2, to echo cancel the audio, a loopback connection 210 may be created for presenter 204. In some embodiments, loopback connection 210 is created for any audio not transmitted via a WebRTC connection during the video stream. Loopback connection 210 may comprise a WebRTC peer connection in which presenter 204 is both the sender of the audio sent through the WebRTC peer connection and the receiver of the audio returned from the WebRTC peer connection. As such, once sent through loopback connection 210, the local audio played through speakers 214 may now be detected as a WebRTC peer connection when received at microphone 220. Thus, web browser 202 may recognize the similar audio signals from the raw audio played by attendees 208 and the local audio received at microphone 220 from speakers 214 and properly echo cancel the local audio for attendees 208. In some embodiments, routing the local audio through loopback connection 210 causes a delay in playing the local audio via speakers 214. As such, when utilizing loopback connection 210, attendees 208 may hear the raw audio slightly before presenter 204 hears the local audio on their speakers 214. In some embodiments, a delay is applied to the transmission of the raw audio sent to attendees 208 to substantially match the delay caused by routing the local audio through loopback connection 210. In some embodiments, the delay is about ms.

Embodiments described herein are not limited to echo cancelling audio from shared video files, and various other audio sources may be echo cancelled by employing loopback connection 210. Broadly, any audio not originating from a WebRTC connection may be routed through loopback connection 210. In some embodiments, the audio originates from web browser 202. In some embodiments, the audio originates from the computing device for presenter 204. As an example, audio from various sources may be configured to route using audio APIs, such as the WebAudio API, and may not be echo cancelled by web browser 202. As yet another example, presenter 204 may receive a notification via their computing device that is played over speakers 214. Similarly, sound effects played via web browser 202 hosting the video stream may be played via speakers 214 and need to be echo cancelled via the loopback connection 210. For example, sending a message in a chat for the video stream may be accompanied by a sound effect that may be routed to the loopback connection 210 and cancelled such that attendees 208 do not hear the notification sound. As yet another example, presenter 204 may be participating in a separate video stream, thus having two separate audio tracks playing simultaneously. In some embodiments, the local audio for the separate audio stream is routed through loopback connection 210 and cancelled or muted to prevent attendees 208 from hearing the extraneous background noise. Other audio sources which may not route audio using WebRTC include audio played from a web browser tab or window separate from the tab or window of the video stream, a separate web browser entirely, a separate computing application on the presenter computing device, and the like. Audio from each of the above described examples may be routed to loopback connection 210 to echo cancel the audio in the video stream when played over speakers 214. In some embodiments, non-WebRTC audio can be sent through loopback connection 210 and muted or cancelled to prevent the audio from transmitting to attendees 208.

In some embodiments, loopback connection 210 may be disabled depending on conditions for the video stream. For example, if the virtual event hosting platform detects that presenter 204 has muted microphone 220, such that no audio is transmitted from presenter 204, loopback connection 210 may be disabled. Additionally, or alternatively, in some embodiments, detection that presenter 204 has changed audio outputs 212 from speakers 214 to a pair of headphones, for example, such that microphone 220 may no longer pick up audio from audio outputs 212, loopback connection 210 may be disabled. As still another example, if presenter 204 configures the virtual event hosting platform to a push-to-talk configuration, loopback connection 210 may be disabled while presenter 204 is not in talk mode.

Figure 3:
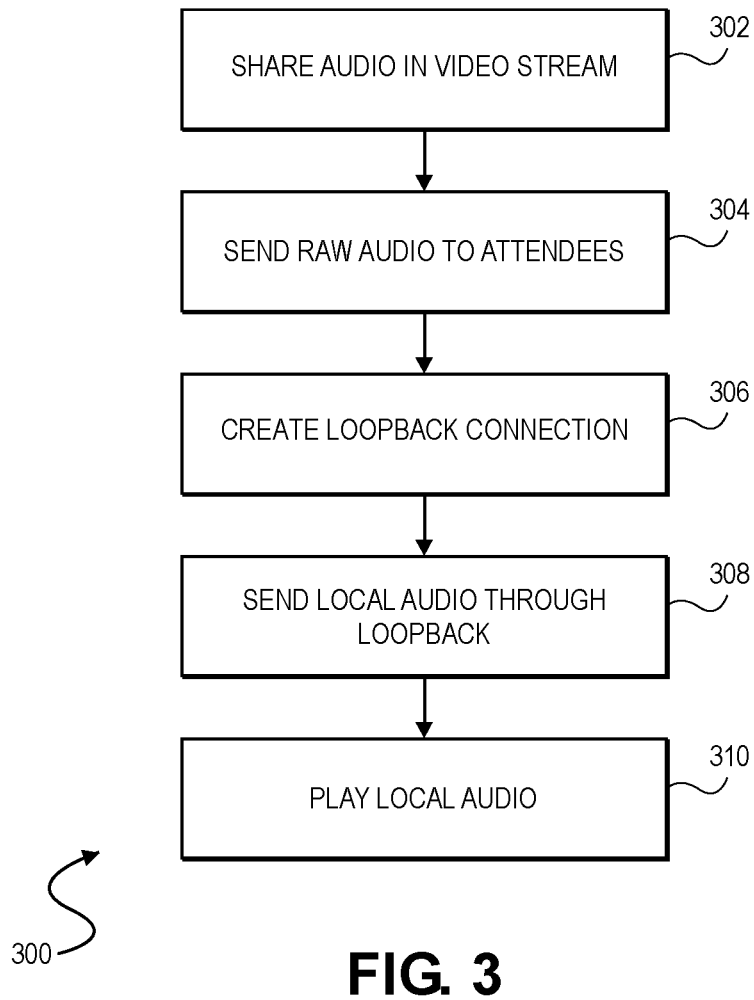
FIG. 3 depicts a flowchart illustrating the operation of a method for echo cancellation in accordance with embodiments of the invention.

FIG. 3 illustrates a method 300 of echo cancelling audio for a video stream for some embodiments. As described above, creation of loopback connection 210 for echo cancelling audio may be done in response to detecting the transmission of non-WebRTC audio in a video stream in which participants are connected utilizing WebRTC. Broadly, any audio source that originates from a non-WebRTC connection may be echo cancelled using method 300 described herein.

At step 302, presenter 204 may share audio in the video stream. In some embodiments, the audio is shared from a file stored locally on a computing device associated with presenter 204. In some embodiments, the audio originates from within web browser 202 but does not originate from a WebRTC connection. For example, presenter 204 may share a video or audio file saved on their computing device. Alternatively, or additionally, the audio may be transmitted from a separate audio source, such as the WebAudio API. In some embodiments, the audio may be played from a separate tab in web browser 202, via a separate web browser, via a separate application on the computing device, or the like. Therefore, echo cancellation may not be enabled for the audio and attendees 208 may receive the same audio twice, thus causing an echo in the video stream.

At step 304, the raw audio may be sent to attendees 208 via the WebRTC connection. Once the attendees 208 receive the raw audio, the raw audio may be played over their audio output devices such that attendees 208 can hear the raw audio for the shared media. In some embodiments, the raw audio is sent with a delay to attendees 208 to substantially match a delay caused by the transmission of the local audio through loopback connection 210 for presenter 204 as described above. Thus, presenter 204 and the attendees 208 may hear the audio at substantially the same time without any delay. When an audio delay is used, the video data (if present) may also be delayed for sending to attendees 208 in order to synchronize associated audio and video.

At step 306, a loopback connection 210 for presenter 204 is created. In some embodiments, when presenter 204 plays the shared video on their local computer, the audio file is not played through a WebRTC connection as described above. As such, web browser 202 may fail to echo cancel the local audio when picked up by microphone 220 and transmitted in the video stream. As described above, loopback connection 210 may comprise a WebRTC connection such that media originating from a non-WebRTC connection may be converted to a WebRTC connection. The loopback connection 210 may have echo cancellation enabled. In some embodiments, the creation of loopback connection 210 is initialized by server 206 detecting audio sent via a non-WebRTC connection and signaling the video client running in web browser 202 for presenter 204 to create loopback connection 210. In some embodiments, the video client detects the transmission of non-WebRTC media and creates loopback connection 210 automatically with no input from server 206. In some embodiments, loopback connection 210 requires both the detection of a non-WebRTC connection and detected echo for at least one of attendees 208.

Next, at step 308, the local audio is sent through loopback connection 210. In some embodiments, echo cancellation for the local audio is enabled when routed from presenter 204 to loopback connection 210. In some embodiments, echo cancellation for the local audio is enabled when the local audio is routed from loopback connection 210 back to presenter 204.

Lastly, at step 310, once the local audio is received from loopback connection 210, the local audio may be played for presenter 204. The local audio may be played via speakers 214 as described above. Thereafter, the local audio may be received at microphone 220. Because the audio signal from the local audio played from speakers 214 may substantially match the raw audio signal played by attendees 208 and both audio signals have now originated from a WebRTC connection, echo cancelling techniques are applied to the video stream in web browser 202.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein, without departing from the scope of the invention as recited in the claims.

The invention claimed is:

1. One or more non-transitory computer-readable media storing computer-executable instructions that, when executed by a processor, perform a method of audio rerouting for echo cancellation in web browsers hosting a video stream, the method comprising:
   receiving, in a web browser and via a microphone on a presenter computing device, spoken audio from a presenter, the spoken audio routed to the video stream using a first type of audio connection,
      wherein the first type of audio connection is a web-based real-time communication (WebRTC) connection comprising echo cancellation functionality;
   in response to receiving the spoken audio, utilizing the echo cancellation functionality for the presenter at the presenter computing device;
   receiving a transmission of media data at the presenter computing device, the media data comprising audio data originating from a second type of audio connection,
      wherein the second type of audio connection is not a WebRTC connection and does not comprise echo cancellation functionality;
   in response to receiving the transmission of the media data, creating a loopback connection at the presenter computing device, the loopback connection routed using the first type of audio connection,
      wherein the loopback connection begins at the presenter computing device and loops back to the presenter computing device;
   routing the audio data from the presenter computing device back to the presenter computing device through the loopback connection to convert the audio from the second type of audio connection to the first type of audio connection; and
   playing, at the presenter computing device, the audio data.

2. The media of claim 1, wherein the method further comprises:
sending, via the web browser and from the presenter computing device, the audio data using the first type of audio connection to at least one other video stream participant.

3. The media of claim 1, further comprising:
concurrent to playing the audio data, receiving the spoken audio at the presenter computing device;
routing the spoken audio to the video stream using the first type of audio connection; and
playing, in the video stream, the spoken audio and the media data.

4. The media of claim 1, wherein the media data originates from the web browser.

5. The media of claim 1, wherein the method further comprises:
receiving, via the microphone on the presenter computing device, background audio; and
in response to receiving the background audio, enabling, in the video stream, background noise suppression for the presenter computing device.

6. The media of claim 1, wherein the method further comprises:
recording the spoken audio for the presenter, the spoken audio recorded at the presenter computing device; and
uploading the spoken audio to a server for storage.

7. The media of claim 2, further comprising delaying the sending of the audio data using the first type of audio connection to the at least one other video stream participant, wherein a time length for the delaying is based on a time for the audio data to route through the loopback connection.

8. A method of audio rerouting for echo cancellation in web browsers hosting a video stream, the method comprising:
receiving, in a web browser and via a microphone on a presenter computing device, spoken audio from a presenter, the spoken audio routed to the video stream using a first type of audio connection,
wherein the first type of audio connection is a web-based real-time communication (WebRTC) connection including echo cancellation functionality;
in response to receiving the spoken audio, utilizing the echo cancellation functionality for the presenter at the presenter computing device;
receiving a transmission of media data at the presenter computing device, the media data comprising audio data originating from a second type of audio connection,
wherein the second type of audio connection is not a WebRTC connection and does not comprise echo cancellation functionality;
in response to receiving the transmission of the media data, routing a first copy of the audio data to the video stream using the first type of audio connection;
in response to receiving the transmission of the media data, routing a second copy of the audio data to a loopback connection at the presenter computing device, wherein the loopback connection comprises the first type of audio connection, and wherein the loopback connection begins at the presenter computing device and loops back to the presenter computing device;
routing the second copy of the audio data from the presenter computing device back to the presenter computing device through the loopback connection having the first type of audio connection to convert the audio data from the second type of audio connection to the first type of audio connection; and
playing, at the presenter computing device, the second copy of the audio data.

9. The method of claim 8, further comprising:
playing, in the video stream, the first copy of the audio data;
playing, at the presenter computing device, the second copy of the audio data; and
echo cancelling the first copy of the audio data and the second copy of the audio data.

10. The method of claim 8, further comprising delaying the routing of the first copy of the audio data to the video stream.

11. The method of claim 10, wherein a time for the delay is selected to substantially match a time for the audio data to route through the loopback connection.

12. The method of claim 8, wherein the method further comprises:
sending, from the video stream, the first copy of the audio data to at least one server; and
forwarding, from the at least one server, the first copy of the audio data to at least one other video stream participant.

13. The method of claim 8, wherein the method further comprises:
detecting a disconnection of an audio input device at the presenter computing device; and
in response to the detection of the disconnection of the audio input device, disabling the loopback connection.

14. The method of claim 8, wherein the loopback connection is created further in response to a detection of an echo within the video stream.

15. A system for audio rerouting for echo cancellation in web browsers hosting a video stream, the system comprising:
an audio input device;
an audio output device;
a processor; and
one or more non-transitory computer-readable media storing computer-executable instructions that, when executed by the processor, perform a method of audio rerouting for echo cancellation in web browsers hosting the video stream, the method comprising:
receiving, in a web browser and via the audio input device on a presenter computing device, spoken audio from a presenter, the spoken audio received using a first type of audio connection, wherein the first type of audio connection is a web-based real-time communication (WebRTC) connection including echo cancellation functionality;
in response to receiving the spoken audio, utilizing the echo cancellation functionality for the presenter at the presenter computing device;
receiving a transmission of media data at the presenter computing device, the media data comprising audio data originating from a second type of audio connection, wherein the second type of audio connection is not a WebRTC connection and does not comprise echo cancellation functionality;
in response to receiving the transmission of the media data, creating a loopback connection at the presenter computing device, the loopback connection routed using the first type of audio connection, wherein the loopback connection begins at the presenter computing device and loops back to the presenter computing device;

routing the audio data from the presenter computing device back to the presenter computing device through the loopback connection to convert the audio data from the second type of audio connection to the first type of audio connection; and playing, via the audio output device, the audio data.

16. The system of claim 15, wherein the method further comprises:
  detecting a disabling of the audio output device for the presenter computing device; and
  in response to detecting the disabling of the audio output device, disabling the loopback connection.

17. The system of claim 15, wherein the method further comprises:
  receiving, from the presenter, a change in an audio input mode for the video stream; and
  in response to receiving the change in the audio input mode for the video stream, disabling the loopback connection.

18. The system of claim 17, wherein the change in the audio input mode for the video stream comprises one of a mute audio mode or a push-to-talk audio mode.

19. The system of claim 15, wherein the media audio data originates locally from the presenter computing device.

20. The system of claim 15, wherein the method further comprises:
  recording the spoken audio for the presenter, the spoken audio recorded at a server associated with the video stream; and
  saving, at the server, the spoken audio for the presenter.

* * * * *